(12) United States Patent
Klews

(10) Patent No.: US 10,442,463 B2
(45) Date of Patent: Oct. 15, 2019

(54) METHOD AND DEVICE FOR ASCERTAINING THE STEERING ANGLE OF A ONE-TRACK VEHICLE

(71) Applicant: Robert Bosch GmbH, Stuttgart (DE)

(72) Inventor: Matthias Klews, Tübingen (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 15/428,590

(22) Filed: Feb. 9, 2017

(65) Prior Publication Data

US 2017/0240203 A1 Aug. 24, 2017

(30) Foreign Application Priority Data

Feb. 18, 2016 (DE) ........................ 10 2016 202 466

(51) Int. Cl.
| | |
|---|---|
| *B62D 15/00* | (2006.01) |
| *B62D 15/02* | (2006.01) |
| *B62K 21/00* | (2006.01) |
| *G01C 19/5776* | (2012.01) |
| *G06F 17/16* | (2006.01) |
| *B62J 99/00* | (2009.01) |

(52) U.S. Cl.
CPC ............ *B62D 15/021* (2013.01); *B62K 21/00* (2013.01); *G01C 19/5776* (2013.01); *G06F 17/16* (2013.01); *B60G 2400/41* (2013.01); *B62J 2099/002* (2013.01)

(58) Field of Classification Search
CPC .................................................. G62D 15/021
See application file for complete search history.

(56) References Cited

U.S. PATENT DOCUMENTS

2016/0046323 A1* 2/2016 Klank .................. B62D 15/021
  701/41
2016/0368546 A1* 12/2016 Wahl ...................... B62D 37/00

FOREIGN PATENT DOCUMENTS

DE 102010063845 A1 6/2012

\* cited by examiner

*Primary Examiner* — John E Breene
*Assistant Examiner* — Jeffrey C Morgan
(74) *Attorney, Agent, or Firm* — Norton Rose Fulbright US LLP; Gerard Messina

(57) ABSTRACT

A method for ascertaining the steering angle of a one-track vehicle, in which: with a frame sensor system attached at a first location on the frame of the vehicle, the first frame accelerations occurring there and first frame rotation rates of the two-wheeler are each ascertained in three first spatial directions, with a steering system sensor system attached at a second location of the steering system of the vehicle, the steering system accelerations of the two-wheeler occurring there are ascertained in three second spatial directions, based on the ascertained first frame accelerations and first frame rotation rates, second frame accelerations at the location of the second steering system sensor system in the three first spatial directions are calculated based on a mathematical relationship, and based on the calculated second frame accelerations and the ascertained steering system accelerations, the steering angle of the vehicle is ascertained.

8 Claims, 1 Drawing Sheet

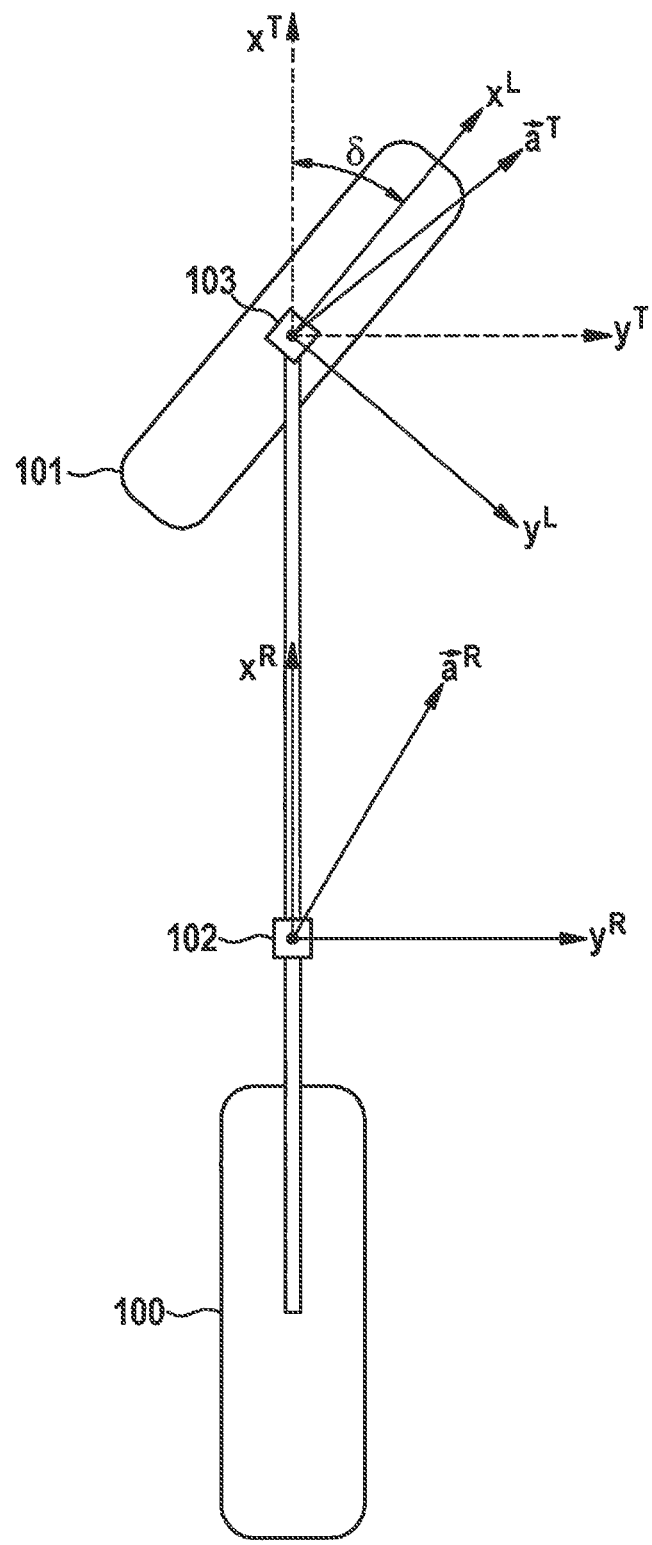

METHOD AND DEVICE FOR ASCERTAINING THE STEERING ANGLE OF A ONE-TRACK VEHICLE

RELATED APPLICATION INFORMATION

The present application claims priority to and the benefit of German patent application no. 10 2016 202 466.3, which was filed in Germany on Feb. 18, 2016, the disclosure of which is incorporated herein by reference.

FIELD OF THE INVENTION

The present invention relates to a method and device for ascertaining the steering angle of a one-track vehicle.

BACKGROUND INFORMATION

An angle sensor for determining the rotational angle of a rotatable body, such as a steering column in a motor vehicle, is discussed in DE 10 2010 063 845 A1. Such steering angle sensors entail relatively high production costs. Moreover, such steering angle sensors are specifically suited for the passenger car segment. In powered two-wheelers or one-track vehicles, in general only small steering angles occur while driving. Steering angle sensors tailored to the passenger car segment therefore typically have too low a resolution in the two-wheeler segment.

SUMMARY OF THE INVENTION

The present invention relates to a method for ascertaining the steering angle of a one-track vehicle, in which:
- with the aid of a frame sensor system attached at a first location on the frame of the vehicle, the first frame accelerations occurring there and first frame rotation rates of the two-wheeler are each ascertained in three first spatial directions which in particular are orthogonal to one another,
- with the aid of a steering system sensor system attached at a second location of the steering system of the vehicle, the steering system accelerations of the two-wheeler occurring there are ascertained in three second spatial directions which in particular are orthogonal to one another,
- based on the ascertained first frame accelerations and first frame rotation rates, second frame accelerations at the location of the second steering system sensor system in the three first spatial directions are calculated based on a mathematical relationship, and
- based on the calculated second frame accelerations and the ascertained steering system accelerations, the steering angle of the vehicle is ascertained.

The present invention thus allows the ascertainment of the steering angle of a one-track vehicle, or also of a one-track motor vehicle or two-wheeler, so that a cost-intensive steering angle sensor may be dispensed with.

One advantageous embodiment of the present invention is characterized in that the frame sensor system is a first inertial sensor cluster or first inertial sensor system, which ascertains the accelerations and rotation rates occurring at the attachment location of the system in each case in the three first spatial directions. Such a sensor system is already frequently present in modern motorcycles, e.g., to determine the tilt angle.

One advantageous embodiment of the present invention is characterized in that the steering system sensor system is a second inertial sensor cluster or inertial sensor system, which is moved or rotated together with the steering column and which ascertains the accelerations occurring at the attachment location of the system in the three second spatial directions.

One advantageous embodiment of the present invention is characterized in that the second frame accelerations $\vec{a}^T$ at the location of the second steering system sensor system are ascertained with the aid of the relationship $$\vec{a}^T = \vec{a}^R - \dot{\vec{\omega}}^R \times \vec{l}^{RL} - \vec{\omega}^R \times \vec{\omega}^R \times \vec{l}^{RL}$$

$\vec{a}^T$ denoting the second frame accelerations, $\vec{a}^R$ denoting the first frame accelerations, $\vec{\omega}^R$ denoting the first frame rotation rates, $\dot{\vec{\omega}}^R$ denoting the derivative of the first frame rotation rates with respect to time, and $\vec{l}^R$ denoting the distance vector from the sensor on the frame or frame sensor system to the sensor on the steering system or steering system sensor system. This calculation may easily be run in an existing control unit, e.g., the brake control unit.

One advantageous embodiment of the present invention is characterized in that the steering angle is ascertained with the aid of the relationship $$\sin \delta = \frac{a_y^T \cdot a_x^L - a_x^T \cdot a_y^L}{a_x^{T2} + a_y^{T2}}$$

$\delta$ denoting the steering angle, $a_x^L$ denoting the steering system acceleration in the longitudinal direction of the front wheel, $a_y^L$ denoting the steering system acceleration in the transverse direction of the front wheel, $a_x^T$ denoting the second frame acceleration in the longitudinal direction of the frame, and $a_y^T$ denoting the second frame acceleration in the transverse direction of the frame.

One advantageous embodiment of the present invention is characterized in that the one-track vehicle is a motorcycle. In particular, in the case of a motorcycle or another motor vehicle often operated at high speed and agility, it is particularly useful to have knowledge of the steering angle, in particular for further processing in a brake or engine control unit.

The present invention further includes a device, containing an arrangement for carrying out the method according to the present invention. This is in particular a control unit which is equipped with the program code for carrying out the method according to the present invention.

BRIEF DESCRIPTION OF THE DRAWING

The FIGURE schematically illustrates in a top view the turned-in front wheel and the rear wheel of a one-track motor vehicle and a sensor cluster attached to the frame and to the steering column.

DETAILED DESCRIPTION

The present invention is based on a two-wheeler, on whose frame an inertial sensor system for sensing accelerations and rotation rates is located and on whose steering system at least one inertial sensor system for sensing accelerations is located. An additional steering angle sensor may be dispensed with. The method introduced hereafter is based on a comparison of acceleration components on the frame and on the steering system. The integration of rotation rates of the steering system for the determination of the steering angle, which carries with it the difficulty of an integration of the rotation rate signals typically subject to offset, may thus be eliminated.

The vehicle has an inertial sensor cluster on the frame, which is able to detect accelerations and rotation rates. On the steering system, a further sensor or a further sensor system rotating together with the steering axle, which is able to detect the accelerations in all spatial directions, is installed on the steering axle.

Hereafter, it is assumed that the sensor on the steering system, when the steering is not turned, and the sensor on the frame, are oriented in parallel to the frame. As a side note, it is mentioned that, for the case of sensors which are installed tilted or rotated, their output signals may be converted into a vehicle-parallel coordinate system with the aid of Euler's rotations.

From the accelerations and rotation rates which are detected by the sensor on the frame, the acceleration at the location of the sensor on the steering system is calculated with the aid of rigid body transformation and compared to the measured accelerations of the sensor on the steering system. The steering angle results from the comparison of the directly measured accelerations on the steering system and the transformed acceleration.

The transformation of the acceleration vector on the frame to the sensor location on the steering system reads:

$$\vec{a}^T = \vec{a}^R - \dot{\vec{\omega}}^R \times \vec{l}^{RL} - \vec{\omega}^R \times \vec{\omega}^R \times \vec{l}^{RL}$$

Here, $\vec{l}^{RL}$ denotes the distance vector between the sensor on the frame and the sensor on the steering system, $\vec{a}^R$ and $\vec{\omega}^R$ are the accelerations and rotation rates of the sensor on the frame. The representation of the vector $\vec{a}^T$ in the coordinate system fixed on the frame and fixed on the steering system is related to the steering angle $\delta$ via the following relationship:

$$\begin{pmatrix} a_x^L \\ a_y^L \end{pmatrix} = \begin{pmatrix} \cos\delta & \sin\delta \\ -\sin\delta & \cos\delta \end{pmatrix} \cdot \begin{pmatrix} a_x^T \\ a_y^T \end{pmatrix}$$

Here, $a_x^L$ and $a_y^L$ denote the x and y components of the acceleration $\vec{a}^L$ measured by the steering system sensor system.

When negotiating curves, in general $a_y^T \neq 0$ applies at the location of the sensor on the steering system ($a_y = 0$ applies only in the center of gravity of the overall system driver+ vehicle when negotiating curves), then this relationship may be solved, e.g., as follows for the steering angle $\delta$:

$$\sin\delta = \frac{a_y^T \cdot a_x^L - a_x^T \cdot a_y^L}{a_x^{T2} + a_y^{T2}}$$

The two prior mathematical relationships were disregarded for the sake of easier representation of the z component of $\vec{a}^L$ and $\vec{a}^T$.

The steering head angle $\tau$ in two-wheelers is generally not equal to zero. The effective steering angle $\delta_{\text{eff}}$ then results from the vehicle-based steering angle $\delta$, the steering head angle $\tau$ and the tilt $\varphi$ from the relationship $$\delta_{\text{eff}} \approx \frac{\cos\tau}{\cos\varphi} \cdot \delta$$

The vehicle-based steering angle $\delta$ is the angle between the frame and the steering system. The sensor cluster on the frame is generally installed in powered two-wheelers in order to determine the tilt $\varphi$, and this variable is thus usually also available for this transformation.

FIG. 1 shows a top view onto rear wheel 100 and front wheel 101 of a one-track vehicle. Front wheel 101 is turned in to the right. Furthermore, the FIGURE shows a frame sensor system 102, which is attached to the frame of the two-wheeler and in particular detects the rotation rates and the accelerations in each case in three spatial directions orthogonal to one another. 103 denotes a steering system sensor system, which rotates together with the handlebar axle and detects the accelerations in three spatial directions orthogonal to one another. The measuring axes of the frame sensor system are denoted by $x^R$ and $y^R$, and $\vec{a}^R$ denotes the measured vectorial acceleration.

On the front wheel, the measuring axes $x^L$ and $y^L$ of the steering system sensor system rotating together with the front wheel are plotted. Furthermore, the measuring axes $x^T$ and $y^T$ of the likewise plotted second frame acceleration $\vec{a}^T$ are shown. These measuring axes $x^T$ and $y^T$ form a coordinate system displaced in parallel to the measuring axes of the frame sensor system. $\vec{a}^T$ denotes the acceleration ascertained at the location of the steering system sensor system, which is calculated with the aid of the rigid body dynamic relationship $$\vec{a}^T = \vec{a}^R - \dot{\vec{\omega}}^R \times \vec{l}^{RL} - \vec{\omega}^R \times \vec{\omega}^R \times \vec{l}^{RL}$$

from the acceleration and rotation rate ascertained by the frame sensor system at its attachment site. Steering angle $\delta$ is not taken into consideration in the calculation of $\vec{a}^T$. Furthermore, steering angle $\delta$ is plotted in FIG. 1.

What is claimed is:

1. A method for ascertaining a steering angle of a one-track vehicle, the method comprising:

ascertaining, with a frame sensor system attached at a first location on the frame of the vehicle, first frame accelerations occurring there and first frame rotation rates of the two-wheeler in three first spatial directions with respect to a first coordinate system centered on the frame sensor system;

ascertaining, with a steering system sensor system attached at a second location on a steering system of the vehicle, steering system accelerations of the two-wheeler occurring there in three second spatial directions with respect to a second coordinate system that rotates with the steering system of the vehicle;

determining, based on the ascertained first frame accelerations and first frame rotation rates at the first location, second frame accelerations at the location of the second steering system sensor system in the three first spatial directions based on a mathematical relationship, wherein the determining includes calculating the second frame accelerations on the basis of a rigid body transformation; and ascertaining, based on the calculated second frame accelerations and the ascertained steering system accelerations, the steering angle of the vehicle resulting from a comparison of the calculated second frame accelerations to the steering system accelerations ascertained at the steering sensor system, the steering angle being ascertained from the perspective of a third coordinate system that is non-rotatable with the steering system and is displaced in parallel from the first coordinate system.

2. The method of claim 1, wherein the frame sensor system is a first inertial sensor cluster, which ascertains the accelerations and rotation rates occurring at the attachment site of the system in each case in the three first spatial directions.

3. The method of claim 1, wherein the steering system sensor system is a second inertial sensor cluster, which rotates together with the steering column and ascertains the accelerations occurring at the attachment site of the system in the three second spatial directions.

4. The method of claim 1, wherein the second frame accelerations at the location of the second steering system sensor system are ascertained with the aid of the relationship $$\vec{a}^T = \vec{a}^R - \dot{\vec{\omega}}^R \times \vec{l}^{RL} - \vec{\omega}^R \times \vec{\omega}^R \times \vec{l}^{RL}$$

$\vec{a}^T$ denoting the second frame accelerations, $\vec{a}^R$ denoting the first frame accelerations, $\vec{\omega}^R$ denoting the first frame rotation rates, $\dot{\vec{\omega}}^R$ denoting the derivative of the first frame rotation rates with respect to time, and $\vec{l}^{RL}$ denoting the distance vector from the sensor on the frame to the sensor on the steering system.

5. The method of claim 4, wherein the steering angle is ascertained with the aid of the relationship $$\sin \delta = \frac{a_y^T \cdot a_x^L - a_x^T \cdot a_y^L}{a_x^{T2} + a_y^{T2}}$$

$\delta$ denoting the steering angle, $a_x^L$ denoting the steering system acceleration in the longitudinal direction of the front wheel, $a_y^L$ denoting the steering system acceleration in the transverse direction of the front wheel, $a_x^T$ denoting the second frame acceleration in the longitudinal direction of the frame, and $a_y^T$ denoting the second frame acceleration in the transverse direction of the frame.

6. The method of claim 1, wherein the three first spatial directions are orthogonal to one another, and the three second spatial directions are orthogonal to one another.

7. The method of claim 1, wherein the one-track vehicle is a motorcycle.

8. A device for ascertaining a steering angle of a one-track vehicle, comprising:

a steering angle ascertaining device that determines the steering angle by, including:

ascertaining, with a frame sensor system attached at a first location on the frame of the vehicle, first frame accelerations occurring there and first frame rotation rates of the two-wheeler in three first spatial directions with respect to a first coordinate system centered on the frame sensor system;

ascertaining, with a steering system sensor system attached at a second location on a steering system of the vehicle, steering system accelerations of the two-wheeler occurring there in three second spatial directions with respect to a second coordinate system that rotates with the steering system of the vehicle;

determining, based on the ascertained first frame accelerations and first frame rotation rates at the first location, second frame accelerations at the location of the second steering system sensor system in the three first spatial directions based on a mathematical relationship, wherein the determining includes calculating the second frame accelerations on the basis of a rigid body transformation; and ascertaining, based on the calculated second frame accelerations and the ascertained steering system accelerations, the steering angle of the vehicle resulting from a comparison of the calculated second frame accelerations to the steering system accelerations ascertained at the steering sensor system, the steering angle being ascertained from the perspective of a third coordinate system that is non-rotatable with the steering system and is displaced in parallel from the first coordinate system.

* * * * *